March 9, 1937.  E. H. BICKLEY  2,073,360
LIQUID LEVEL INDICATOR
Filed Feb. 16, 1935
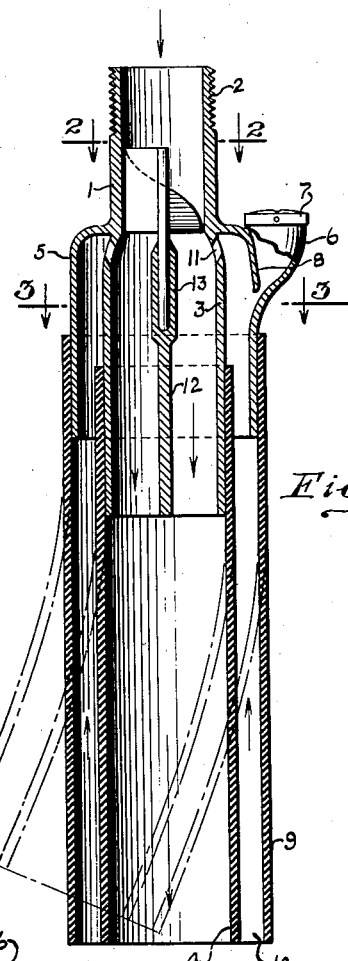
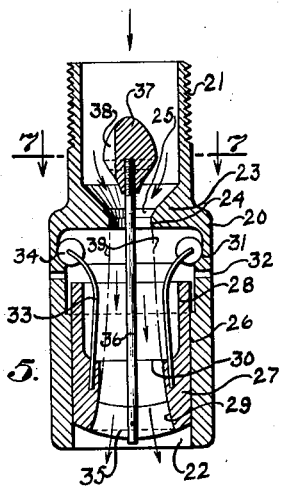
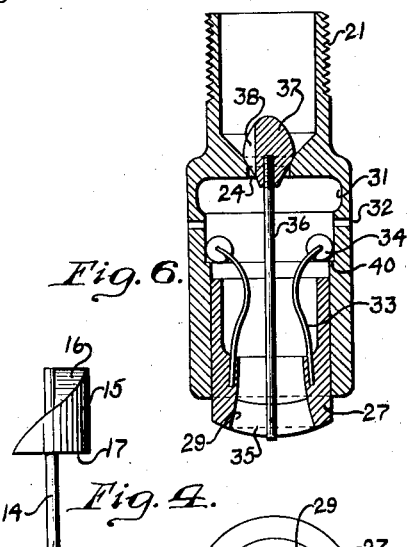
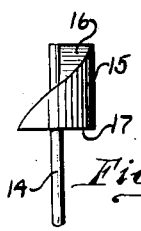
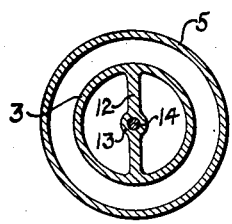
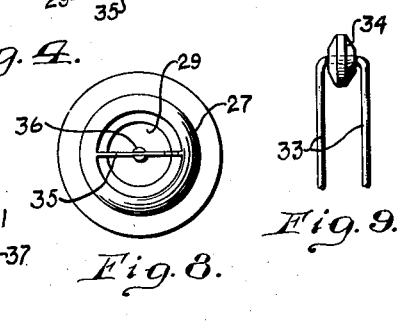
INVENTOR
Everett H. Bickley,
BY
J. Stuart Freeman,
ATTORNEY Patented Mar. 9, 1937

2,073,360

UNITED STATES PATENT OFFICE 2,073,360

LIQUID LEVEL INDICATOR

Everett H. Bickley, Cynwyd, Pa.

Application February 16, 1935, Serial No. 6,831

11 Claims. (Cl. 226—66)

The object of the invention is to provide improvements in liquid level indicators generally, but more especially in those types which are particularly adapted for use upon portable objects, such as the nozzles of hose and other devices by means of which tanks or other containers are filled with oil, water, liquid fuel, etc.

One of the greatest uses for the present invention is in connection with the nozzles by which vehicle tanks of all kinds are filled with gasoline and oil. Much of such filling is done in respectively dark places, such as in garages even during the day, while at night it is quite generally difficult in any location to see clearly, if at all, the level of the fuel and much less the oil in the tanks of automobiles, trucks, airplanes, and the like. The mechanic or service station attendant is therefore without means of telling when the desired level of the liquid has been reached, and, if he uses a lamp or flashlight for such purpose, his other hand is required, instead of both the filling and the level indicating means being carried and operated by the same hand.

Another object of the invention is therefore more specifically to provide a preferably detachable device for normal use upon the free end portion of a filling nozzle, whereby no lamp or light of any sort is required and the operator is automatically advised of the fact that the desired level has been reached, so that he can immediately, or as soon thereafter as desired, shut off the flow of liquid by means of the usual valve.

A further object is to provide a modified form of the invention, in which in addition to or in lieu of merely advising the operator that the desired level has been reached, automatically shuts off and prevents the further flow of liquid into the tank, and if desired continues to shut off such flow as by means of an auxiliary valve, until the main valve is manually shut, the nozzle withdrawn, and the auxiliary valve re-set for further use.

And a still further object is to provide a device of the latter type, which instead of shutting off the flow of liquid entirely, operates to shut off the major portion of the flow, but permits thereafter the continued flow of a comparatively small quantity, until a definite number of gallons or other unit measurement is reached, when shutting off the main valve effects a complete cessation of the flow, and the nozzle is removed from the tank and re-set for further use.

With these broad objects in mind, the invention comprises additional details of construction and operation, which are fully brought out in the following description, when read in conjunction with the accompanying drawing, in which Fig. 1 is a vertical, diametrical section of one embodiment of the invention, comprising an audible signalling device;

Figs. 2 and 3 are horizontal sections on the lines 2—2 and 3—3 of Fig. 1;

Fig. 4 is a side elevation of the rotary member shown in Figs. 1 and 2;

Fig. 5 is a vertical, diametrical section of a modified form of the invention, which shuts off the major portion of the flow of the liquid, but permits a small portion of the liquid to flow thereby, the valve being in open position;

Fig. 6 is a similar view of the same modification with the valve shown in closed position;

Fig. 7 is a horizontal sectional view on the line 7—7 of Fig. 5;

Fig. 8 is a bottom plan view of this modification; and

Fig. 9 is a fragmentary elevational view of one of the spring-pressed valve-positioning rollers.

Referring to Figs. 1 to 4 of the drawing, the embodiment of the invention here shown comprises what will be termed a tubular body portion 1, provided with screw threads 2 or other means for normally connecting the device securely to the discharge end of any well known type of nozzle (not shown), either with or without a primary valve for regulating the flow of liquid past such nozzle. A hollow liquid discharge tube 3, comprises a preferably integral extension of said body 1, and if desired may in turn be provided with a flexible hose extension 4, such hose extension being adapted for insertion into the filling aperture of a tank or other container, such for instance as the fuel tanks commonly found upon vehicles of various sorts, including automobiles, trucks, aircrafts, motor boats, and the like, said tubular extension by reason of its relative flexibility being adapted to curve around angles or partitions within or adjacent to the intake aperture of such tank.

A second tube 5, preferably surrounding and concentric with said first tube 3, is preferably joined to the body 1 substantially at the point of union of said body with said first tube, and the adjacent end portion of said outer tube being closed, except for any suitably shaped offset 6, comprising a support for an air whistle 7 or other desired form of pneumatically actuated audible signalling device. If desired, the hollow region connecting said signalling device with the interior of the outer tube may be shielded and relatively restricted by means of a partition 8 or the like. However, such partition is not essential to the operation of the invention.

The second or outer tube 5 may be of the same or a different length than that of the first tube 3, and in similar manner to said first tube it preferably carries a flexible hose 9, which also operates in a manner similar to the hose hereinbefore described, while the annular opening formed between the free end portions of the two hose extensions 4 and 9 comprises an air (or other gas) inlet aperture 10, for the passage of air into and thru the outer tube 5, whence it normally enters the outer or farthest portion of the inner tube 3 by way of one or more ports 11.

The inner tube 3 is provided with any suitable form of transversely extending septum or spider 12, which offers no appreciable resistance to the flow of liquid thru said tube, and at its normally upper end forms a bearing 13, in which is rotatably positioned the shaft 14 of a rotatable liquid-interrupting means, which in this case comprises a head 15, provided with an upwardly directed spiral surface 16, and in geometrical projection spanning approximately one-half of the area of either or both said body 1 and the tubular extension 3, said head preferably being solid to all intents and purposes, from its spirally shaped cam surface 16 downwardly towards its relative planular surface 17, which latter extends in this form of the device at substantially right angles to the axis of the shaft 14.

This head 15 is adapted to rotate freely within the interior of the tubular body 1, as hereinbefore mentioned, and as a liquid flowing thru said body encounters said spiral surface, the head 15 is automatically rotated, thereby, while permitting a continuous flow of liquid through said body, intermittently interrupts the otherwise continuous flow of liquid past the port 11, and thereby producing air gaps between the consecutive longitudinally positioned portions of such liquid past said port. As these gaps pass the one or more orifices 11, the suction caused by the next succeeding portion of the liquid in axial alignment with a given orifice tends to suck air into the inner tube 3 from the outer tube 5.

This inflowing air normally passes upwardly thru the hose 9 and tube 5, as hereinbefore described, but instantaneously upon the closing of said intake 10 by the level of the liquid upon reaching the same, it is unable longer to enter the hose 9 and is drawn into the upper portion of the outer tube 5 by way of the whistle, or other form of pneumatically actuated audible device 7, with the result that a well defined sound or alarm is produced, such as will at once notify the operator that the level of liquid within the tank or other container has reached the free end portion of the tubes 4 and 9.

In this preferred embodiment of the invention, it is to be understood that many variations may be made, such for instance as providing the tubes 3 and 5 side by side, instead of co-axial with each other, and that the form and arrangement of the signalling device may vary throughout an indefinite number of variations.

Referring now to Figs. 5 to 9, the modified form of the invention here shown comprises in general a tubular body portion 20, having a suitably threaded intake end 21, adapted to be secured to the discharge end of a hose or other nozzle, either provided with or in the absence of a main controlling valve, forming a part of, or otherwise controlling the flow of liquid thru, such nozzle. The member 20 is provided intermediate its intake end and its discharge end 22 with a partition 23, having an aperture 24 defined upwardly by a valve seat 25. The lower portion of said member is so formed as to provide an internal guiding surface 26 of any desired shape, and adapted to slidably receive an axially movable element 27, which in turn is provided at or in its upper portion with a relatively large bore 28, and in its lower portion with a relatively restricted and downwardly flaring bore 29, said bores having interposed between them an annular shoulder 30.

The inner surface of said body member is provided preferably immediately below the partition 23 with an annular groove 31, and also beneath said partition with one or more intake orifices 32, said orifices, however, being preferably above the inner end of the reciprocatory member 27, when said element is in its normal innermost position, as shown in Fig. 5. In order to yieldingly position said element in the position here shown, it is provided at circumferentially spaced intervals with any suitable means as that illustrated by the inverted U-shaped wire springs 33, each of which carries upon its free end portion a rotatable anti-friction roller 34, or equivalent device, for normally engaging within the groove 31, said rollers being pressed radially outwardly into said groove by the resiliency of the respective springs 33.

The lower and relatively narrower bore 29 in this form of the device is interrupted slightly by a suitably shaped septum or spider 35, to which is secured the lower end portion of a valve rod 36, which extends freely thru the partition aperture 24 and carries upon its opposite end a valve 37, provided with a relatively restricted by-pass 38.

It will also be noted that the interior of the member 20 may be also provided with an annular shoulder 40 against which the rollers 34 are adapted to strike, and thereby yieldingly arrest the downward movement of the element 27, shown in Fig. 6, in cooperation with the stoppage of the valve by contact with its seat.

In the operation of this form of the device, the several ports are normally positioned as shown in Fig. 5, and the device itself is inserted into the filling aperture of a tank or other liquid container. The usual valve controlling the flow of liquid thru the hose or nozzle by which the device is carried is then opened, so that the desired liquid may flow freely thru the raised valve 37 and into the tank, neither the hose, the nozzle, nor the tank being illustrated. The resiliency of the springs 33, by maintaining the anti-friction rollers 34 in expanded relation in engagement with the sides of the annular groove 31, likewise normally maintains the axially movable element 27 in its uppermost position, and it has been found that the current of liquid passing thru the partition aperture 24 tends to maintain a relatively solid column, substantially within the bounds indicated by the dot-and-dash lines 39.

However, as soon as the level of the liquid in the tank or other container rises to the heighth of the intake port or ports 32, the first few drops of such liquid entering said ports are drawn violently downwardly by the inflowing stream of liquid, and upon enlarging said stream said drops collectively impinge against the shoulder 30, and initially cause the element 27 to snap into its lowermost position, thereby seating the valve 37 and arresting the otherwise free flow of the liquid thru said partition aperture.

This construction in the absence of the by-pass 38 is sufficient to shut off the further flow of liquid completely, and may be used in such cases as those in which the operator is required to leave the apparatus and give his attention to other interest, since the invention in this form prevents the tank from overflowing, and the operator may thereafter at his convenience shut off the further flow of liquid by means of the main valve, either within or associated with the hose or inlet by which the device is carried, at the same time withdrawing the device from the intake aperture to the tank, and resetting the same by manually pressing the reciprocatory element 27 inwardly or upwardly, so as to reposition the anti-friction rollers 34 in the groove 31 and simultaneously open the valve 37.

On the other hand, when the valve is provided with the by-pass 38 or its equivalent, the device may be employed to shut off the major portion of the flow of liquid into the tank, as soon as the level of such liquid reaches the intake ports 32, while a relatively restricted quantity of such liquid continues to flow thru said by-pass after the valve is closed, as long as may be desired, as for instance until the usual indicating or recording pump or dispenser of the liquid shows that the exact definite unit of measurement, such as a specific number of gallons has been reached, whereupon the flow thru the supporting hose or valve may be shut off as in common practice, and the improved auxiliary valve removed from the tank and reset as hereinbefore described.

In lieu of the rotating member for producing an irregular flow of liquid, in the first of the devices hereinbefore described, for providing a suction in the branch channel, a divergent nozzle or jet may be employed on the principle of the Sprengle pump, but the advantage of employing the rotating element is that it permits the passage of a relatively greater volume of liquid, along with satisfactory operation of the audible signal.

Having thus described my invention what I claim as new and desire to secure by Letters Patent is:—

1. A liquid level indicator, comprising a liquid conducting tube, means automatically actuated by the passage of liquid to produce an irregular flow of liquid in said tube, a signal producing device, and a second tube communicating with said first tube and with said signal device, whereby a gas normally entering said first tube thru said second tube will operate said signal device, when the flow of gas in said second tube is stopped by the liquid upon reaching a given height in a tank.

2. A liquid level indicator, comprising a liquid conducting tube, rotary means actuable by liquid flowing thru said tube to produce an irregular flow of liquid therethru, a signal producing device, and a second tube communicating with said first tube and with said signal device, whereby a gas normally entering said first tube thru said second tube will operate said signal device, when the flow of gas in said second tube is stopped by the liquid upon reaching a given height in a tank.

3. A liquid level indicator, comprising a liquid conducting tube, means automatically actuated by the passage of liquid to produce an irregular flow of liquid in said tube, an audible gas-actuated signal producing device, a second tube communicating with said first tube and with said signal device, whereby a gas normally entering said first tube thru said second tube will flow instead thru and actuate said signal device, when the flow of gas thru said second tube is stopped by the liquid reaching a given level in a tank.

4. A liquid level indicator, comprising a liquid conducting tube, rotary means actuatable by liquid flowing thru said tube to produce an irregular flow of liquid therethru, an audible gas-actuated signal producing device, and a second tube communicating with said first tube and with said signal device, whereby a gas normally entering said first tube thru said second tube will flow instead thru and actuate said signal device, when the flow of gas thru said second tube is stopped by the liquid reaching a given level in a tank.

5. A liquid level indicator, comprising a liquid conducting tube, means automatically actuated by and operative to produce an irregular flow of liquid thru said tube, a second tube substantially co-axial with said first tube and communicating with said first tube at their generally upper portions, and a signal producing device communicating with said second tube, whereby a gas normally entering the first tube thru the second tube will flow instead thru and actuate said signal device, when the flow of gas thru the second tube is stopped by the liquid reaching a given level in a tank.

6. A liquid level indicator, comprising a liquid conducting tube, rotary means actuable by liquid flowing thru said tube to produce an irregular flow of liquid therethru, a second tube substantially co-axial with said first tube and communicating with said first tube at their generally upper portions, and a signal producing device communicating with said second tube, whereby a gas normally entering the first tube thru the second tube will flow instead thru and actuate said signal device, when the flow of gas thru the second tube is stopped by the liquid reaching a given level in a tank.

7. A liquid level indicator, comprising a liquid conducting tube, means automatically actuated by and operative to produce an irregular flow of liquid thru said tube, a second tube surrounding and spaced from said first tube, and communicating with said first tube at their generally upper portions, and a signal producing device communicating with the generally upper portion of said second tube, whereby a gas normally entering the first tube thru the second tube will flow instead thru and actuate said signal device, when the flow of gas thru the second tube is stopped by the liquid reaching a given level in a tank.

8. A liquid level indicator, comprising a tubular body portion, a tubular extension forming a continuation of said body portion, a second tube forming a unitary extension of said body portion and communicating at its generally inner end with the interior of said first extension, a signal device communicating with the interior of said second extension, and means automatically actuated by the flow of liquid to make the flow of such liquid thru said body and first extension irregular, air normally being drawn into said first extension thru said second extension between consecutive portions of said fluid, and when said second extension is closed air being drawn thru said signal device and into said first extension.

9. A liquid level indicator, comprising a tubular body portion, a tubular extension forming a continuation of said body portion, a second tube surrounding and spaced from said extension and at its generally inner end communicating with the interior of said extension, a signal device communicating with the interior of said surrounding tube, and means actuatable by the flow of liquid thru said body and first extension to make such flow irregular and thereby draw air thru said surrounding tube and thence into said extension, and when the outer end of said surrounding tube is closed by liquid air being drawn by the flow of fluid in said extension thru said signal device.

10. A liquid level indicator, comprising a tubular body portion having an inlet, a tubular extension forming a continuation of said body portion and having an outlet, rotatable means mounted therein and actuatable by the flow of liquid therethru to make such flow irregular to produce intervening air gaps, and a second tube also forming an extension of said tubular body and substantially parallel with said extension, and at an end communicating with the interior of said extension, and a pneumatically actuated signalling device adapted to be actuated by air flowing into said second tube, when the inlet of said second tube is closed by liquid.

11. A liquid level indicator, comprising a tubular body portion having an inlet, a pair of substantially parallel tubular extensions, one of which provides a continuation of the channel of the body portion and is adapted to receive and discharge from its outlet a liquid flowing thru said body portion, and the other extension communicating with the interior of said channel and having an intake end located substantially in the vicinity of the outlet of said first extension, a pneumatically actuated signal device communicating through said second with said first tubular extension, and rotary means actuatable by liquid flowing thru said channel to make such flow irregular and produce air gaps, whereby when the normal flow of air into said first extension from said second extension is prevented by liquid from entering the said intake end, air actuates said signal device.

EVERETT H. BICKLEY.